United States Patent [19]

Matyscak et al.

[11] Patent Number: 5,362,204
[45] Date of Patent: Nov. 8, 1994

[54] GAS TURBINE WITH FLANGED-ON EXHAUST GAS CASING

[75] Inventors: Kamil Matyscak, Brenden, Germany; Traugott Schmid, Wettingen, Switzerland

[73] Assignee: Asea Brown Boveri Ltd., Baden, Switzerland

[21] Appl. No.: 114,180

[22] Filed: Sep. 1, 1993

[30] Foreign Application Priority Data

Sep. 26, 1992 [DE] Germany ............................ 4232385

[51] Int. Cl.⁵ ...................... F01D 25/24; F01D 25/28
[52] U.S. Cl. ................................. 415/213.1; 415/118; 415/189; 415/201; 415/208.2; 415/209.2; 415/211.2; 415/214.1; 403/336; 403/338
[58] Field of Search .............. 415/189, 190, 209.2, 415/209.3, 209.4, 213.1, 214.1, 220, 208.2, 211.2, 118, 201; 403/335, 336, 337, 338

[56] References Cited

U.S. PATENT DOCUMENTS

| | | | |
|---|---|---|---|
| 2,803,429 | 8/1957 | Whitehead | 415/201 |
| 4,101,243 | 7/1978 | Tatkov et al. | 415/201 |
| 4,691,637 | 9/1987 | Leigh | 403/338 |
| 4,974,989 | 12/1990 | Salter | 403/337 |
| 5,102,298 | 4/1992 | Kreitmeier | 415/211.2 |

FOREIGN PATENT DOCUMENTS

| | | | |
|---|---|---|---|
| 0491388 | 3/1953 | Canada | 415/201 |
| 0491966A1 | 7/1992 | European Pat. Off. | |
| 1009638 | 6/1957 | Germany . | |
| 1034924 | 7/1958 | Germany | 415/220 |
| 3406548A1 | 7/1985 | Germany . | |
| 0223300 | 10/1986 | Japan | 415/214.1 |
| 270343 | 8/1950 | Switzerland . | |

*Primary Examiner*—Edward K. Look
*Assistant Examiner*—Christopher Verdier
*Attorney, Agent, or Firm*—Burns, Doane, Swecker & Mathis

[57] ABSTRACT

In a gas turbine having a blade carrier (2) which is suspended coaxially in a turbine casing (3), both the turbine casing and the blade carrier are provided with a horizontal junction plane. An exhaust gas casing (5), whose bounding walls consist essentially of an annular inner part on the hub side and an annular outer part (7), is gastightly connected by means of an annular flange (7A) to an annular flange (3A) of the turbine casing (3). Between the annular flanges a two-part separating ring (13) having at least one conically extending face (13A) is disposed. The angle of the conically extending face (13A) has a self-locking effect.

2 Claims, 1 Drawing Sheet

GAS TURBINE WITH FLANGED-ON EXHAUST GAS CASING

BACKGROUND OF THE INVENTION

1. Field of the Invention

The invention relates to a gas turbine having a blade carrier for the guide blades which is suspended coaxially in a turbine casing, in which both the turbine casing and the blade carrier are provided with a horizontal junction plane in which their respective top and bottom halves are bolted together, and in which downstream of the outlet moving blades is an adjoining exhaust gas casing, the bounding walls of which consist essentially of an annular inner part on the hub side and an annular outer part, said parts bounding a diffuser, and in which the outer part is gastightly connected by means of an annular flange to an annular flange of the turbine casing.

2. Discussion of Background

In unsteady operation, such as frequently occurs in power station gas turbines in the covering of peak loads, thermal stresses and differential expansions arise in the casings and lead to deformations of the casings and to variations of clearance between casing and rotor, while they may also affect the shaft mounting. Damage to the bearings and stuffing boxes and also blade damage may then occur. In modern machines the diffuser adjoining the blading is itself no longer supported on the foundation, but is integrated into the exhaust gas casing, which in turn is flanged to the turbine casing of the turbomachine.

Thus, even when access is required only to the combustion chamber region, the machine together with the exhaust gas duct generally has to be uncovered.

SUMMARY OF THE INVENTION

Accordingly, one object of this invention is to provide a novel measure, in a machine of the kind indicated at the outset, by means of which the partial uncovering of the machine is made possible.

According to the invention this is achieved by disposing between the annular flanges a two-part separating ring having at least one conically extending face.

It is then particularly expedient for the angle of the conically extending face to have a self-locking effect. When the usual flange bolts are tightened, the self-locking prevents the half-ring from being pressed out radially.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

Only the elements essential to the understanding of the invention are shown. Parts of the installation which are not illustrated are for example the compressor part, the combustion chamber and the complete exhaust gas pipe and the flue. The direction of flow of the working medium is indicated by arrows.

DESCRIPTION OF THE PREFERRED EMBODIMENTS

Figure 1:
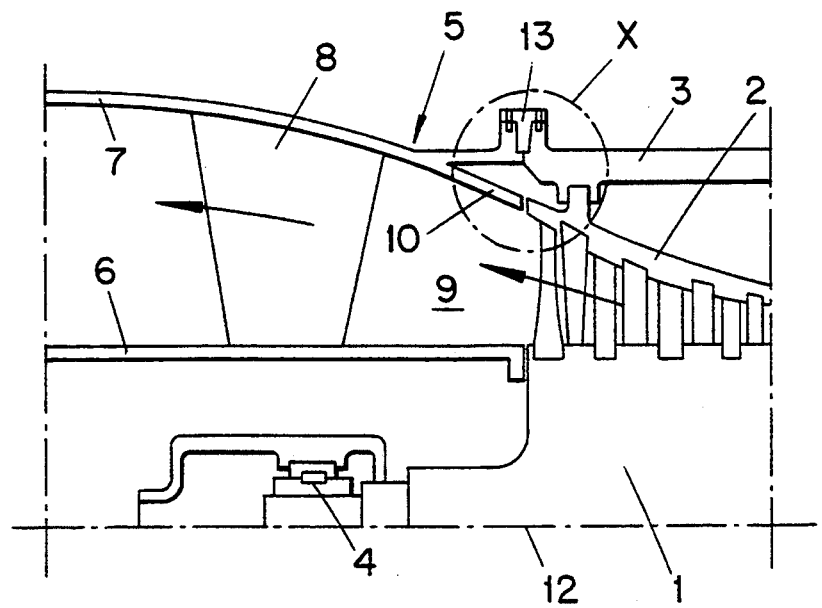
FIG. 1 shows a partial longitudinal section of the gas turbine.

Referring now to the drawings, wherein like reference numerals designate identical or corresponding parts throughout the several views, the gas turbine, of which FIG. 1 shows only above the machine axis 12 the exhaust side and the last four axial-flow stages, consists essentially of the rotor 1 equipped with moving blades and the blade carrier 2 equipped with guide blades. The blade carrier 2 is suspended by means of projections 2B in corresponding seats 3B in the turbine casing 3. The exhaust gas casing 5 is flanged to the turbine casing 3 and consists essentially of an annular inner part 6 on the hub side and an annular outer part 7, said parts bounding the diffuser 9. The two elements 6 and 7 may be half-shells having an axial junction plane or be one-piece pot casings. They are joined together by a plurality of radial flow ribs 8 which are welded to them and are uniformly distributed over the periphery. The annular outer part 7 is provided on the turbine side with an annular sealing strip 10, which is flush with the contour of the turbine flow channel on the cylinder side. In the cavity inside the inner part 6 is disposed the turbomachine mounting on the outlet side, the rotor 1 lying in a supporting bearing 4.

The turbine casing 3 and the blade carrier 2 are provided with a horizontal junction plane, shown schematically as lying in the machine axis 12. The usually flanged top and bottom halves of the turbine casing and of the blade carrier are bolted together in said junction plane.

Figure 2:
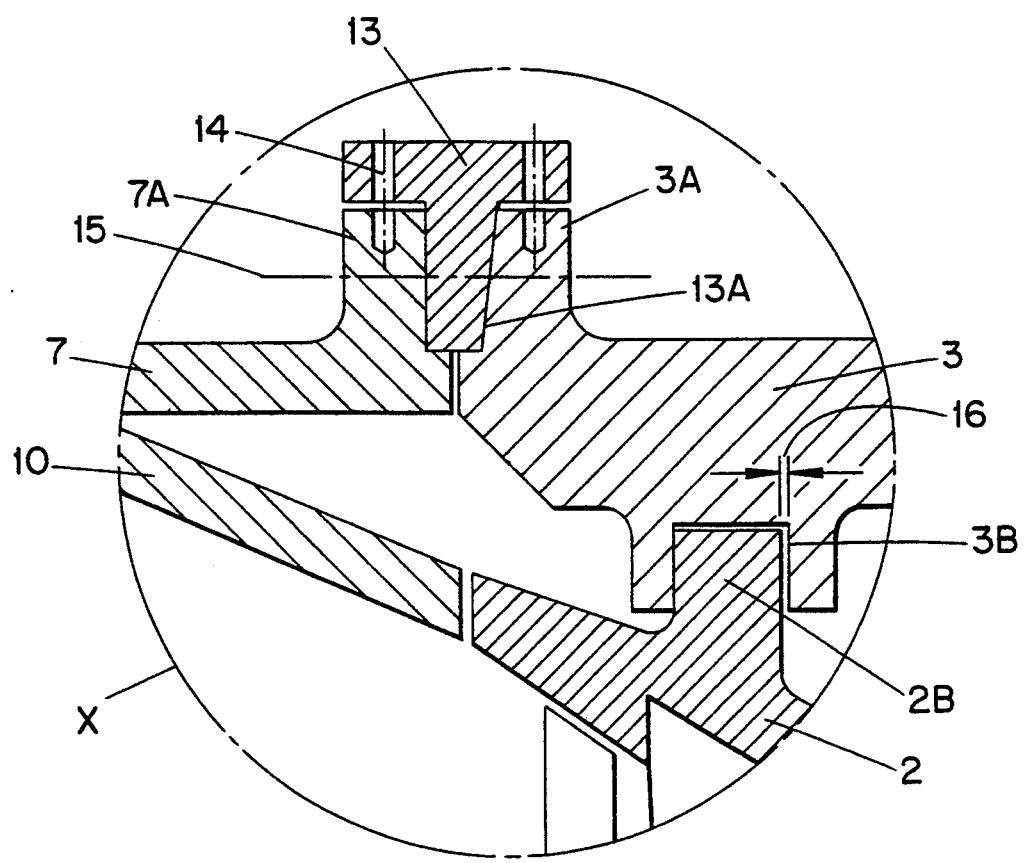
FIG. 2 shows on a larger scale the detail X in FIG. 1.

The outer part 7 of the exhaust gas casing is provided on the turbine side with an annular flange 7A. The latter is gastightly bolted to an annular flange 3A of the turbine casing 3. Between the two annular flanges a two-part separating ring 13, likewise provided with a horizontal junction plane, is inserted. Its cross-section is T-shaped, its horizontal portion covering the two annular flanges 3A and 7A. The face 13A of the vertical part of the ring, on the turbine side, has a conical shape with an angle not greater than 8°. That surface of the annular flange 3A which cooperates with the conical face 13A is given corresponding conicity. This provides the arrangement with a self-locking action. When the flange bolting connection, which in FIG. 2 is merely indicated by its center line 15, is tightened, the ring half cannot move radially outwards.

If for example the top halves of the turbine casing and blade carrier now have to be uncovered in order to inspect the blades, after the flange bolt connection has been released only the top half of the separating ring 13 also has to be dismantled. After removal of this half-ring, the turbine casing 3 can be slightly moved axially to the right. For this purpose a slight axial clearance 16 is provided on one side between the projection 2B and the seat 3B. The blade carrier suspension 2B, 3B is thereby relieved of load and the top halves of the elements 3 and 2 can be lifted off radially.

From these observations it is clear that access to the interior of the turbine is now possible without it being necessary to dismantle the exhaust gas casing 5. This gives rise to a considerable saving of time for inspection purposes.

The exhaust gas casing 5 usually consists of a welded sheet metal structure, which for the reasons previously explained may tend to become deformed. An exhaust gas casing deformed in this way may cause difficulties in its attachment to the turbine casing. In order to provide a remedy, the crossbars of the separating ring 13 are provided with radial bolt connections (of which in FIG. 2 only the bolt holes 14 are shown). The bolts engage in the annular flanges 3A and 7A. With the aid of these bolts a deformed exhaust gas casing being attached can be forced into its original position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas turbine comprising:
   a blade carrier for guide blades which is suspended coaxially in a turbine casing, both the turbine casing and the blade carrier provided with a horizontal junction plane in which their respective top and bottom halves are bolted together;
   an exhaust gas casing downstream of outlet moving blades, the exhaust gas casing adjoining the turbine casing, bounding walls of the exhaust gas casing comprising an annular inner part on a hub side and an annular outer part, said parts bounding a diffuser, the outer part gastightly connected by an annular flange with a flange bolt connector to an annular flange of the turbine casing; and,
   a two-part separating ring disposed between the annular flanges, the two-part separating ring having at least one conically extending face on a vertical part, a transverse bar portion and screw fasteners radially directed to fasten the transverse bar portion to the annular flanges of the turbine casing and the exhaust gas casing to align the annular flanges.

2. A gas turbine as claimed in claim 1, wherein the angle of the conically extending face has a self-locking effect.

* * * * *